(12) United States Patent
Acker

(10) Patent No.: US 9,835,474 B2
(45) Date of Patent: Dec. 5, 2017

(54) METHOD FOR PRODUCING A SENSING DEVICE

(71) Applicant: Continental Teves AG & Co. oHG, Frankfurt (DE)

(72) Inventor: Heinrich Acker, Schwalbach (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 2 days.

(21) Appl. No.: 14/764,314

(22) PCT Filed: Jan. 31, 2014

(86) PCT No.: PCT/EP2014/051936
§ 371 (c)(1),
(2) Date: Jul. 29, 2015

(87) PCT Pub. No.: WO2014/118332
PCT Pub. Date: Aug. 7, 2014

(65) Prior Publication Data
US 2015/0362339 A1    Dec. 17, 2015

(30) Foreign Application Priority Data

Feb. 1, 2013 (DE) .................. 10 2013 201 722

(51) Int. Cl.
*G01D 5/20* (2006.01)
(52) U.S. Cl.
CPC .................... *G01D 5/2046* (2013.01)
(58) Field of Classification Search
CPC .... G01D 5/2291; G01D 5/2452; G01R 15/18; G01R 15/183; G01R 31/027;
(Continued)

(56) References Cited

U.S. PATENT DOCUMENTS

| 4,774,465 A | 9/1988 | Nilius |
| 5,204,621 A * | 4/1993 | Hermann ............. G01D 5/2046 |
| | | 324/207.18 |

(Continued)

FOREIGN PATENT DOCUMENTS

| DE | 2325752 | 11/1975 |
| DE | 3518772 | 11/1986 |

(Continued)

OTHER PUBLICATIONS

Nakano et al.; Displacement sensor; Jul. 24, 2008; JP2008170360(A); Shinko Electric Co. Ltd. G01B7/00.*

(Continued)

*Primary Examiner* — Melissa Koval
*Assistant Examiner* — Nasima Monsur
(74) *Attorney, Agent, or Firm* — RatnerPrestia

(57) ABSTRACT

A sensor for detecting a position of an encoder magnet in a direction of motion, including: a first coil extending in the direction of motion, a second and third coil, which are aligned with the first coil and which are arranged symmetrical to each other with respect to a point of symmetry as observed in the direction of motion and which accordingly form a first and second transformer with the first coil, the transformation ratio of which transformers depends on the position of the encoder magnet, and a magnetic asymmetry, which changes the transformation ratio of one of the transformers with respect to the other transformer.

10 Claims, 9 Drawing Sheets

(58) Field of Classification Search
CPC ............ G01R 31/2829; G01R 33/0029; G01R 33/038; G01R 33/3808; H02M 7/043; F16D 2066/003; F16D 2125/20; F16D 2300/18; G01B 7/003; G01L 5/0023; A61B 17/221; A61B 17/22; A61B 17/22012; A61B 17/22004; A61M 25/00; A61M 5/32; A61M 5/178; A61M 5/20; A61L 31/145; A61L 26/008; A61L 27/52
USPC .... 324/207.16, 207.15, 207.13, 207.11, 200, 324/207.25, 117 R, 207.24, 127, 207.22, 324/207.23, 225, 654; 384/448
See application file for complete search history.

(56) References Cited

U.S. PATENT DOCUMENTS

| | | | |
|---|---|---|---|
| 5,973,494 | A | 10/1999 | Masreliez |
| 6,346,870 | B1 | 2/2002 | Bill |
| 6,937,129 | B2* | 8/2005 | Hsueh ................. H01F 27/2823 336/198 |
| 7,317,371 | B1 | 1/2008 | Carroll |
| 7,602,175 | B2 | 10/2009 | Mednikov |
| 7,994,778 | B2* | 8/2011 | Kirchdoerffer ...... G01D 5/2046 324/207.12 |
| 8,207,749 | B2 | 6/2012 | Reime |
| 2004/0040391 | A1 | 3/2004 | May |
| 2009/0102463 | A1 | 4/2009 | May |
| 2010/0237855 | A1* | 9/2010 | Turner ................ G01D 5/24438 324/207.16 |
| 2010/0301843 | A1 | 12/2010 | Kronowitter |
| 2014/0203801 | A1 | 7/2014 | Lehmann |

FOREIGN PATENT DOCUMENTS

| | | |
|---|---|---|
| DE | 4025101 | 2/1992 |
| DE | 4128159 | 2/1993 |
| DE | 4425903 | 3/1997 |
| DE | 19719905 | 11/1997 |
| DE | 19726256 | 8/1998 |
| DE | 19718150 | 11/1998 |
| DE | 10342473 | 5/2005 |
| DE | 102010002505 | 9/2011 |
| DE | 102012215940 | 3/2013 |
| EP | 0145290 | 1/1989 |
| EP | 0238922 | 1/1990 |
| EP | 0707190 | 12/1998 |
| EP | 2149784 | 2/2010 |
| JP | 2008170360 | 7/2008 |
| WO | WO 0101066 A1 * | 1/2001 ............. B60T 7/042 |
| WO | 03071231 | 8/2003 |
| WO | 2007137693 | 12/2007 |

OTHER PUBLICATIONS

German Search Report for German Application No. 10 2014 201 790.4 dated May 19, 2015, including partial translation.
International Search Report for International Application No. PCT/EP2014/051936 dated Apr. 3, 2014.
Chinese Office Action dated Jun. 2, 2016 for Chinese Application No. 201480006946.7, including translation, 10 pages.
Notice of Allowance for U.S. Appl. No. 14/770,156, dated Apr. 13, 2017, 14 pages.
Chinese Office Action for Chinese Application No. 201480011772.3, dated Jul. 19, 2016 with translation, 15 pages.
German Search Report for German Application No. 10 2013 203 586.1, dated Jun. 5, 2013, incluidng partial translation, 4 pages.
International Search Report for International Application No. PCT/EP2014/053506, dated May 16, 2014, 2 pages.
Non final Office Action for U.S. Appl. No. 14/770,156, dated Dec. 1, 2016, 23 pages.

* cited by examiner

METHOD FOR PRODUCING A SENSING DEVICE

CROSS REFERENCE TO RELATED APPLICATIONS

This application is the U.S. National Phase Application of PCT International Application No. PCT/EP2014/051936, filed Jan. 31, 2014, which claims priority to German Patent Application No. 10 2013 201 722.7, filed Feb. 1, 2013, the contents of such applications being incorporated by reference herein.

FIELD OF THE INVENTION

The invention relates to a method for producing a measuring pickup and to the measuring pickup.

BACKGROUND OF THE INVENTION

DE 44 259 03 C3, which is incorporated by reference, and EP 238 922 B1, which is incorporated by reference, disclose position sensors which operate in accordance with the principle of linear position measurement on the basis of a permanent-magnetic linear contactless displacement, referred to as PLCD. Such position sensors are also known as linear inductive position sensors, referred to as LIPS.

SUMMARY OF THE INVENTION

An aspect of the invention aims to improve the known position sensors.

In accordance with one aspect of the invention, a sensor for detecting a position of an encoder magnet in a movement direction comprises a first coil extending in the movement direction, a second and third coil oriented after the first coil, which second and third coils are arranged symmetrically with respect to one another in the movement direction, when considered in relation to a point of symmetry, and correspondingly form, with the first coil, a first and second transformer, whose transformation ratio is dependent on the position of the encoder magnet, and a magnetic asymmetry, which changes the transformation ratio of one of the transformers with respect to the other transformer.

The specified sensor is thus constructed symmetrically with respect to its measurement range. An asymmetry should in the text which follows here be understood to mean an element in the specified sensor which introduces an asymmetry into this symmetry of the measurement range. Therefore, the element does not need to be constructed asymmetrically in all respects; it should only distort the symmetry within the measurement range.

In one development of the specified sensor, the magnetic asymmetry comprises a geometric asymmetry.

In another development of the specified sensor, the transformation ratio of the transformer, which is arranged at the front when viewed in the movement direction of the encoder magnet, is greater, by the magnetic asymmetry, than the transformation ratio of the transformer which is arranged at the rear, when viewed in the movement direction of the encoder magnet.

In yet another development of the specified sensor, the asymmetry comprises an asymmetric geometry of the second coil with respect to the third coil.

In an additional development of the specified sensor, the asymmetric geometry of the second coil with respect to the third coil comprises an asymmetric turns number and/or turns number per unit length of the second coil with respect to the third coil.

In an alternative development of the specified sensor, the asymmetry comprises a location-dependent change in the geometry of the first coil.

In a preferred development of the specified sensor, the asymmetry comprises an element which changes a coupling between the first coil and the second coil of the first transformer with respect to a coupling between the first coil and the third coil of the second transformer.

In a particular development of the specified sensor, the element comprises a location-dependent cross-sectional geometry viewed in the movement direction.

In a particularly preferred development of the specified sensor, the element is arranged asymmetrically, when viewed from the point of symmetry.

The specified sensor is particularly preferably a linear position sensor (LIPS).

In accordance with a further aspect of the invention, an apparatus for actuating a braking system of a vehicle comprises a brake pedal for setting a braking force by displacing the brake pedal in a movement direction and a sensor as claimed in one of the preceding claims for detecting the position of the brake pedal in the movement direction and for outputting a signal indicating the braking force to be set depending on the detected position of the brake pedal.

BRIEF DESCRIPTION OF THE DRAWINGS

The above-described properties, features and advantages of this invention and the way in which they are achieved will become clearer and more easily comprehensible in connection with the description below of the exemplary embodiments, which are explained in more detail in connection with the drawings, in which.

DETAILED DESCRIPTION OF THE PREFERRED EMBODIMENTS

The same technical elements are provided with the same reference symbols and only described once in the figures.

Figure 1:
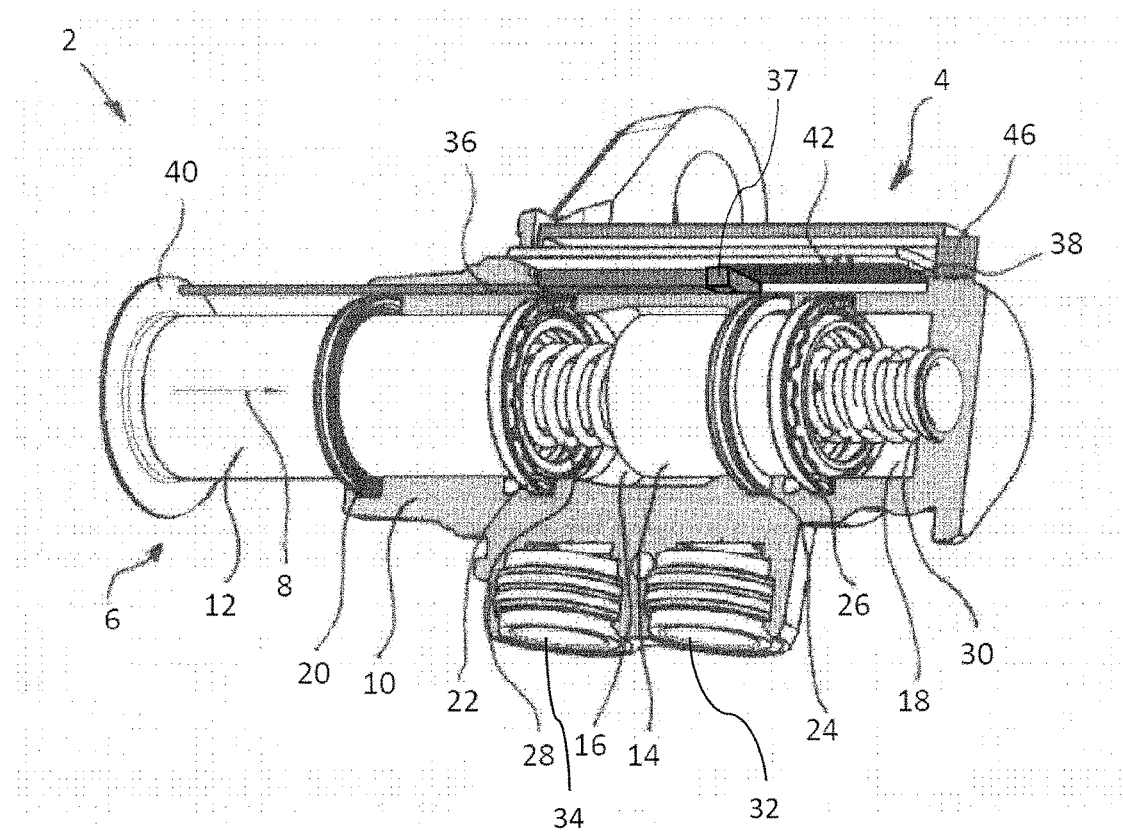
FIG. 1 shows a schematic illustration of a tandem master cylinder comprising a position sensor.

Reference is made to FIG. 1, which shows a tandem master cylinder 2 comprising a position sensor 4.

The tandem master cylinder 2 also has a pressure piston 6, which is arranged movably in a movement direction 8 in a housing 10, wherein the movement of the pressure piston 6 can be controlled by a foot pedal (not shown). The pressure piston 6 itself is divided into a primary piston 12 and a secondary piston 14, wherein the primary piston 12 closes an inlet of the housing 10 and the secondary piston 12 divides the interior of the housing 10 into a primary chamber 16 and a secondary chamber 18. A secondary collar 20 is arranged in the region of the inlet of the housing 10 on the primary piston 12, which secondary collar insulates the interior of the housing 10 from the ambient air. When viewed into the interior of the housing 10, a primary collar 22 follows the secondary collar 20, said primary collar sealing a gap between the primary piston 12 and a wall of the housing 10. A pressure collar 24 on the secondary piston 14 isolates the pressure of the primary chamber 16 from the pressure of the secondary chamber 18. In addition, a further primary collar 26 on the secondary piston 14 seals a gap between the secondary piston 14 and the wall of the housing 10. The primary piston 12 is supported against the secondary piston 14 via a first spring 28, while the secondary piston is supported against a housing base via a second spring 30. Correspondingly, hydraulic fluid (not shown) can be supplied to the primary chamber 16 and the secondary chamber 18 via a first and second connection 32, 34.

Since the mode of operation of a tandem master cylinder is known to a person skilled in the art, no detailed description thereof is provided here.

The position sensor 4 has a sampling element in the form of a slide 36 comprising an encoder magnet 37 at its top end, which, when viewed into the plane of the drawing, can be pushed beneath a sensor circuit 38 (yet to be described). In order to push the slide 36, the primary piston 12 has a flange 40, which the slide 36 abuts. The flange 40 and the primary piston 12 therefore together form a measurement object, whose position is determined by the sensor circuit 38 (yet to be described) of the position sensor 4. The sensor circuit 38 is formed from a plurality of conductor tracks on a wiring carrier 42, such as a leadframe, a printed circuit board or another substrate. In order to protect against contamination, for example, a cover 46 can be positioned on the printed circuit board 42 with the sensor circuit 38.

Figure 2:
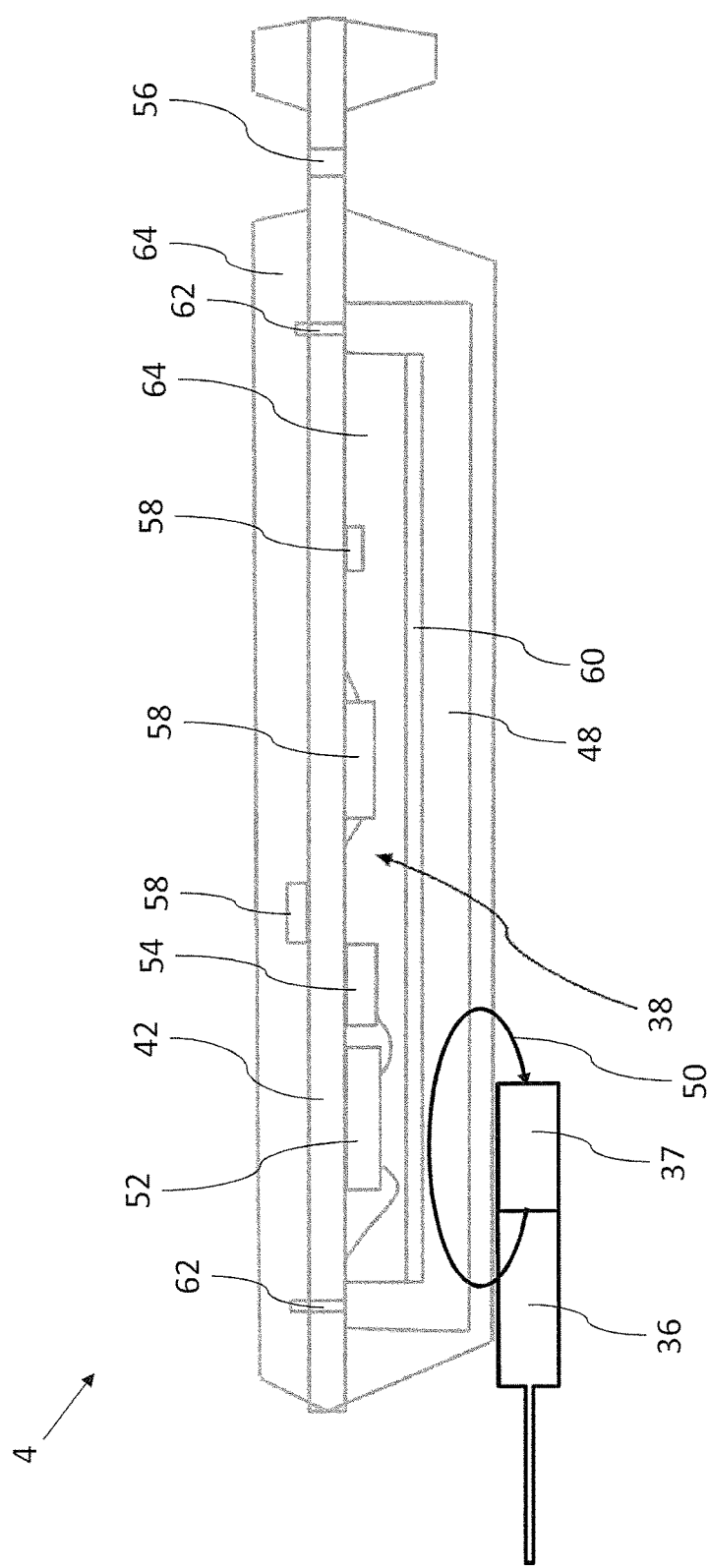
FIG. 2 shows a schematic illustration of the position sensor from FIG. 1.

Reference is made to FIG. 2, which shows the position sensor 4 shown in FIG. 1.

The circuit 38 of the position sensor comprises a transducer 48, which in the present embodiment is in the form of a linear inductive position sensor (LIPS). The LIPS 48 detects a magnetic field 50 of the encoder magnet 37 and outputs an electrical encoder signal (not denoted) to the circuit 38 on the basis of this magnetic field. This encoder signal is converted by a first signal processing chip 52 and a second signal processing chip 54 into a measurement signal (not denoted), from which the position of the slide 36 and therefore the position of the flange 40 and the primary piston 12 is provided. The measurement signal thus produced can finally be tapped off at a transmission interface 56 of the position sensor 4 via a cable (not illustrated) and passed on to a higher signal processing unit (not illustrated) such as, for example, a motor controller in a vehicle (not illustrated).

The circuit 38 can comprise protection elements 58 for protecting the two signal processing chips 52, 54, for example from an overvoltage. In addition, a shielding plate 60 can be arranged between the circuit 38 and the LIPS 48, said shielding plate shielding electromagnetic fields between the circuit 38 and the transducer 48 and thus avoiding an influence of the circuit 38 on the LIPS 48.

In the present embodiment, the LIPS 48 is arranged via a form-fitting connection 62 in a defined position on the wiring carrier 42. In this case, a protective compound 64 surrounds the wiring carrier 42 and the transducer 48.

Figure 3:
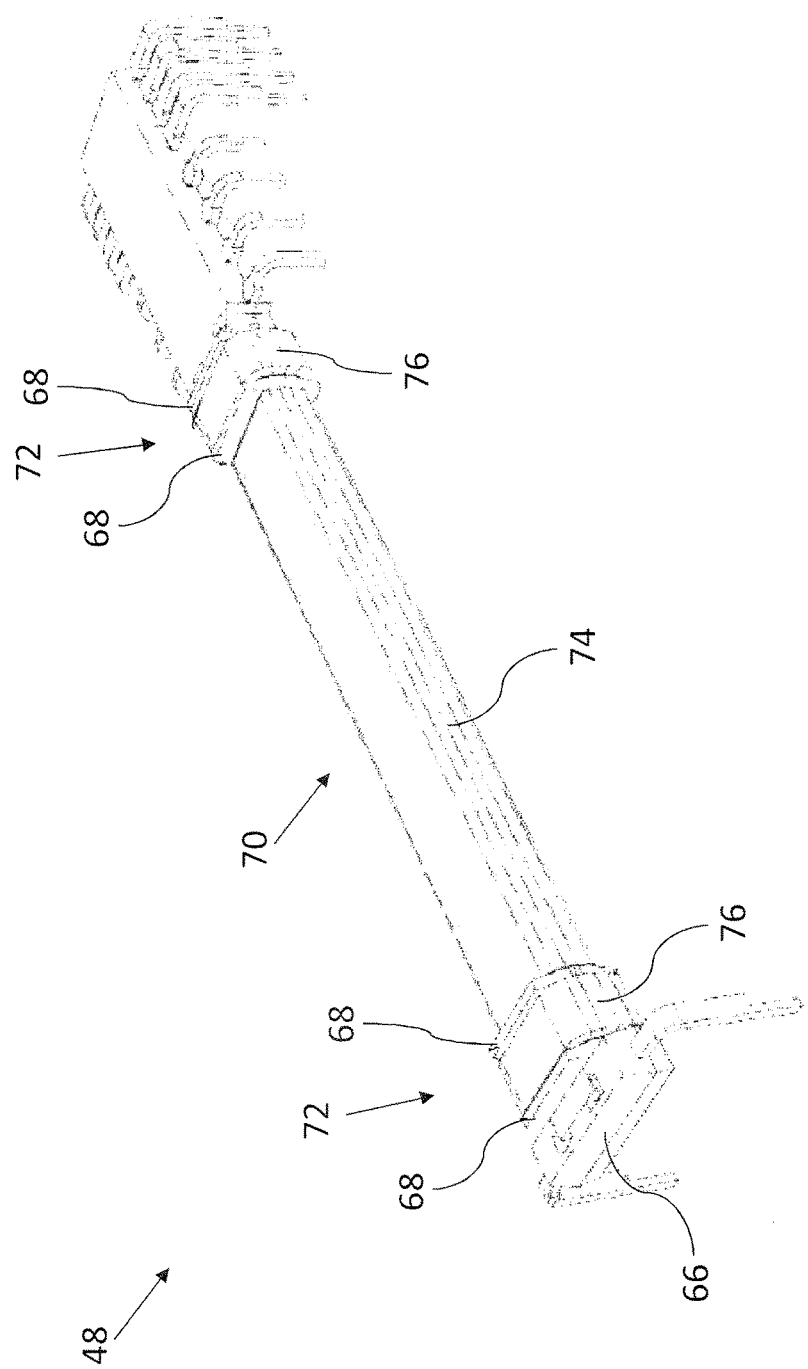
FIG. 3 shows a perspective view of a linear position sensor.

FIG. 3 shows a perspective view of the LIPS 48. The LIPS 48 comprises a coil former 66 comprising a winding space which is divided via four webs 68 into a central section 70 and two side sections 72. The coil former 66 bears a primary coil 74, which extends along a core (of which no more is shown in FIG. 3) and is intended to be assumed to be in the form of a single layer in this case. The coil former 66 bears tightly wound secondary coils 76 for measuring an induced voltage at the two opposite peripheral zones of the primary coil 74.

That is to say that the coils 74, 76 in the LIPS 48 can differ in two different ways. Firstly, the coils interact as part of a measuring transformer, wherein the primary coil 74 excites a magnetic field and induces the induced voltage in the secondary coils 76. The choice of primary and secondary coils 74, 76 is in principle as desired and does not need to be configured in the way shown in FIG. 3. The LIPS 48 in the present embodiment is intended to be capable of being evaluated with ratiometric signal processing, for which reason the choice of primary coil 74 and secondary coils 76 is as previously mentioned. The signal processing connected to such a LIPS 48 performs in each case one measurement of the induced voltage at both secondary coils 76 and calculates the two measured induced voltages using a suitable algorithm, with the aim of suppressing faults. In the simplest case, this can take place by virtue of the secondary coils 76 being connected in series in a suitable manner. Preferably, this takes place by analog or digital signal processing which provides large degrees of freedom in the configuration of a mathematical mapping, with which the position value is calculated from the two induced voltages.

In addition, the coils 74, 76 can be divided, in terms of their geometric configuration, into coils 74 having a low turns number per unit length which are wound approximately along the entire core length (in the present exemplary embodiment the primary coil 74) and those which are wound compactly with a high turns number per unit length at a specific point of the core (not shown) (in the present exemplary embodiment the secondary coils 76).

Further details relating to the mode of operation of a LIPS are set forth, for example, in the documents DE 44 259 03 C3 and EP 238 922 B1.

Figure 4:
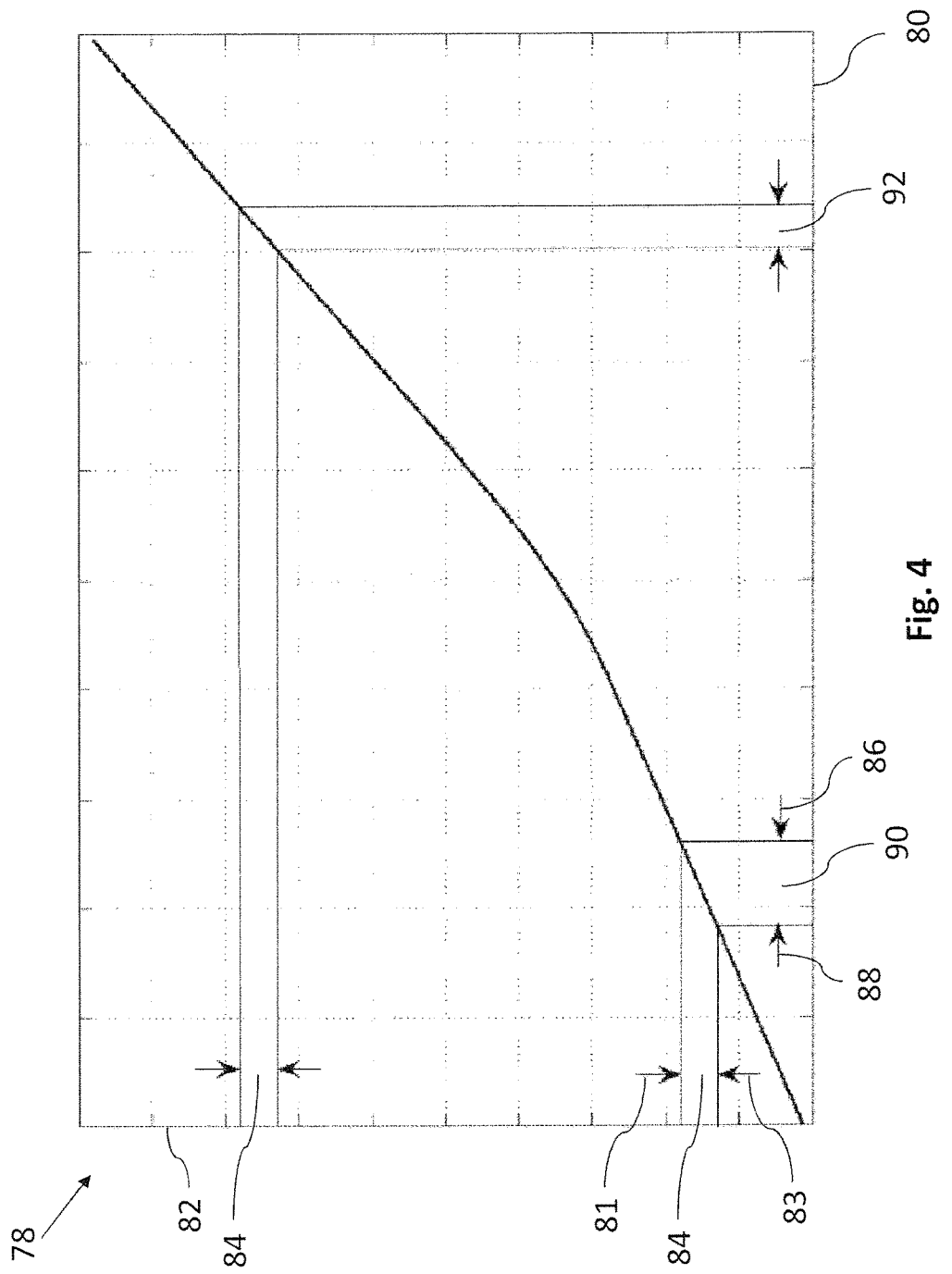
FIG. 4 shows a characteristic of the linear position sensor from FIG. 3.

The LIPS 48 has a characteristic 78 illustrated in FIG. 4 in which the variable to be measured, i.e. the position 80 of the encoder magnet 37 and the output variable indicating the variable to be measured, i.e. the induced voltages 82 at the secondary coils 76 are set against one another.

Depending on the application case, it may be desirable for the LIPS 48 for either the characteristic 78 to always have the same gradient everywhere or for it to permanently have zones with a different gradient.

If the characteristic 78 of the LIPS 48 has a linear profile, the measurement results of the LIPS 48 can be further-processed directly in an analog controller, a measurement mechanism or for display for manual reading (note in relation to terminology: linear position measurement=measurement of linear movements; linear characteristic=linear relationship between measured position and output variable). Therefore, in most cases nowadays it is attempted to construct the LIPS 48 with a linear characteristic 78. Should the characteristic 78 be nonlinear in principle, it can be corrected easily in digital systems. In this case, the sensitivity of the LIPS 48 and therefore its accuracy and its resolution are constant and are influenced by the gradient of the linear characteristic.

An example of a use with location-dependent accuracy and resolution requirements and therefore, considered over the entire measurement range, a nonlinear characteristic is an electrohydraulic braking system comprising the tandem master cylinder 2 shown in FIG. 1, in which the LIPS 48 is used for measuring the brake pedal position. The LIPS 48 detects, by means of the brake pedal position, the driver's intention and uses the measurement result in an associated control system (not illustrated any further). In a passenger vehicle which is moving in normal road traffic, the brake pedal position will quite predominantly be in the rest position or near the rest position, whereas a severely deflected brake pedal, corresponding to full braking, is a rare driving situation. This situation is of superior importance for the safety of the vehicle, but does not require the greatest sensitivity in the brake pedal. The stringent requirements as regards the quality of the control in the braking system are set with a small delay in many braking operations, on the other hand, because sensitive control of the braking operation is critical for comfort and driving response in these braking operations. A high degree of comfort in this sense can be achieved by virtue of accuracy and resolution of the position sensor in the initial range being increased, possibly at the cost of the corresponding values at the end of the measurement range. The driver will profit from a high degree of accuracy because the system then responds to a specific deflection of the brake pedal in a particularly reproducible manner as regards the delay achieved. The driver will profit from a high degree of resolution because the potentially disruptive discretization of the measured variable remains hidden in a digital system in this case.

The LIPS 48 should therefore be configured such that its characteristic 78 matches the application. Secondly, the coils 74, 76 of the LIPS 48 should protrude as little as possible beyond the end points of the measurement range. This is the configuration which is particularly relevant for electrohydraulic braking systems in which high accuracy and resolution are required at the start of the measurement range and in the vicinity thereof and at the same time the physical space in this part of the measurement range is particularly restricted. That part which comprises the rest position of the brake pedal and braking with a small delay, i.e. in particular the range which is used constantly during travel in normal road traffic without an emergency situation, can be considered to be the start of the measurement range, for example.

Here begins the exemplary embodiment in which the characteristic 78 of the LIPS 48 is intentionally nonlinear. This nonlinear characteristic 78 can be used for increasing the performance of the LIPS 48 by virtue of the nonlinear characteristic 78 being matched to the location-dependent accuracy and resolution requirement of the respective application.

Resolution and accuracy are increased locally where the nonlinear characteristic of the LIPS 48 is steeper, i.e. a specific change in the measured variable results in a severe change in the output variable (=increased sensitivity). Conversely, resolution and accuracy decrease locally where the nonlinear characteristic 78 has a flatter profile. Usually, only a limited value range is available for the output variable, and therefore one of these properties needs to be sacrificed for a local increase in the rate of rise of the characteristic 78 and of the resolution and accuracy at another point.

The cause of the dependence of the gradient on the resolution and accuracy is that interference and noise which are likewise transmitted from the LIPS 48 or other stages of signal processing to the induced voltages 82 as output variable are usually not changed in terms of their amplitude by the characteristic 78 (i.e. with respect to the measured variable). At any point on the characteristic 78, interference and noise therefore have a typical value of a characteristic variable (amplitude, spectral power density, rms value or the like) which downwardly limits the distinguishability of adjacent values. The steeper the characteristic 78, the closer associated distinguishable values of the position 80 to be detected as measured variable are to one another, which is illustrated by way of example in FIG. 4.

If it is assumed using an example of FIG. 4 that there is a distinguishability of output values 81, 83 of the induced voltages 82 as output variable which differ by an output difference 84, a distinguishability of two values 86, 88 of the position 80 to be detected as measured variable which differ by a first measurement difference 90 results in the flat region of the characteristic 78. In the steep region of the characteristic 78, the same output difference 84 for the induced voltages 82 results in a second measurement difference 92, which is less than the first measurement difference 90 and therefore distinguishable therefrom, on the other hand. The interval required for the distinguishability is directly the resolution. Since much interference usually likewise only acts as output variable within a specific interval in the induced voltages 82, the relationship as regards accuracy is analogous.

In the context of the abovementioned braking system, it would be favorable, for example, to configure the LIPS 48 to be less susceptible to interference in the lower value range of the position 80 to be detected since the driver will probably actuate the brake pedal with more sensitivity in this value range, as already mentioned, than in the upper value range of the position 80 to be detected. For this purpose, the gradient of the characteristic 78 of the LIPS 48 could be configured to be smaller in the lower value range than in the upper value range.

For this purpose, within the scope of the present embodiment, the geometric configuration of the transformer resulting from the coils 74, 76 is modified. Instead of a completely symmetrical design of the LIPS 48, at least an asymmetry is introduced into the transformer in a targeted manner, in which at least one component of the LIPS 48 (one of the windings, the halves of a winding pair or the core) is asymmetrical with respect to a plane which is arranged perpendicular to the measurement direction in the center of the measurement range of the position 80 to be measured. Given a corresponding configuration of the asymmetry, the contributions of the saturation of the core and/or the induced voltages 82 to the measurement result change depending on the position 80 of the encoder magnet 37, as a result of which the desired nonlinearity in the characteristic 78 is achieved.

Possibilities for producing an asymmetry with the desired characteristic change are illustrated by way of example at a point further below. These possibilities can in principle be combined. Their effect will generally be intensified when combined. Owing to the severe nonlinearity of the operating principle of the LIPS 48, it can be assumed that the combination cannot be treated in accordance with the superimposition principle. The contribution of a specific change to the configuration of the transformer comprising the coils 74, 76 is therefore also dependent on the other changes to the configuration.

The individual changes to the configuration are as follows (definition of "start" as above, "end" correspondingly, relates to the measurement range and therefore the position to be detected of the encoder magnet 37):
1. Change in length of the core (not shown in FIG. 3)
    a. extension of the core at the start
    b. shortening of the core at the end.

2. Change in the number of turns of the secondary windings
   a. increase turns number of the secondary winding at the start
   b. reduce turns number of the secondary winding at the end.
3. Location-dependent change in the turns number per unit length of the primary winding
   a. increase turns number per unit length at the start
   b. reduce turns number per unit length at the end.
4. If a second core is provided outside the windings (magnetic return path core)
   a. reduce material cross section of the magnetic return path core at the start
   b. increase material cross section of the magnetic return path core at the end.

Changes in configuration 1.a. to 3.a. result in higher voltages being induced, which is generally an advantage. However, this entails additional consumption of materials and a higher installation space requirement, especially at the start. Therefore, the complementary changes in configuration 1.b. to 3.b. are expedient despite reduced voltages since savings are correspondingly made on material and installation space.

Figure 5:
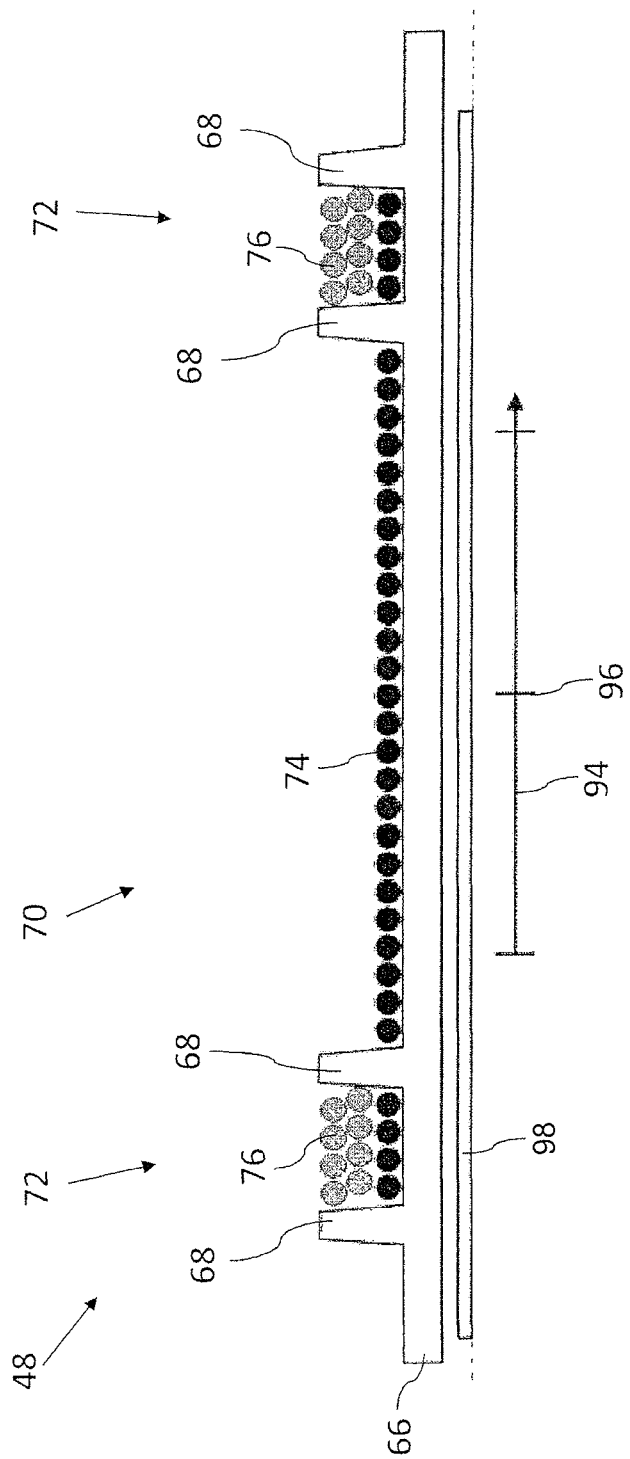
FIG. 5 shows a sectional illustration of the linear position sensor from FIG. 3.

FIG. 5 additionally shows a scale for the measurement range 94 of the sensor. The start of the measurement range 94 (indicated by the arrow direction of the measurement range) and the end are clearly between the two secondary coils 76 because the output voltage of a LIPS 48 reaches an extremum when the encoder magnet 37 (not illustrated) comes close to the secondary coils. If the encoder magnet 37 moves beyond this point, the same measurement results are achieved for these positions as within the measurement range 94. Therefore, the encoder magnet 37 needs to maintain a minimum spacing from the secondary coils 76, by means of which the measurement range 94 is limited. The center of the measurement range 94 therefore marks the above-mentioned plane of symmetry with respect to the coil former 66 and measuring transformers and is therefore provided with the reference symbol 96 for reasons of clarity.

In this case the core 98 of the LIPS 48 which is used for constructing the measuring transformer from the coils 74, 76 is arranged asymmetrically with respect to the plane of symmetry 96 in FIG. 5 by virtue of the core 98 being extended at the start and/or shortened at the end.

Figure 6:
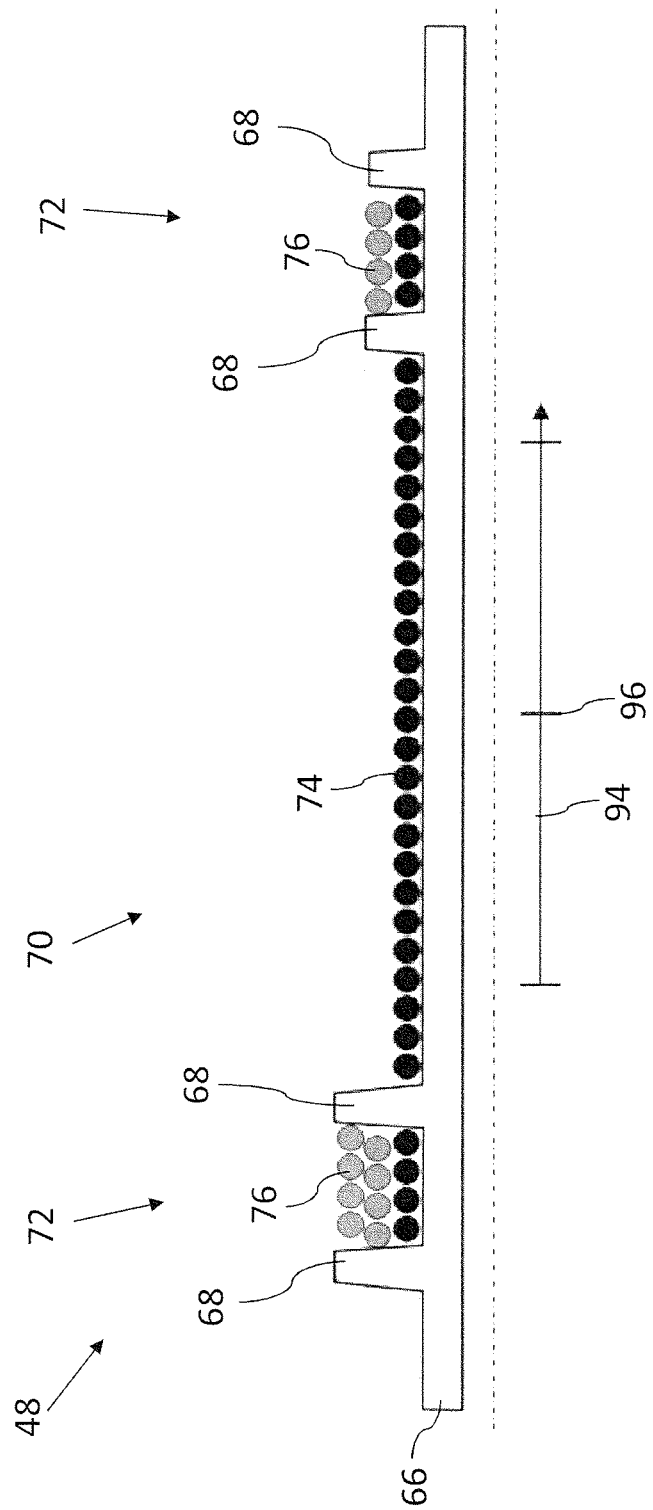
FIG. 6 shows a sectional illustration of an alternative linear position sensor.

FIG. 6 shows a solution corresponding to point 2b from the above list. The secondary coil 76 at the end of the measurement range 94 has fewer turns, for example only half the number of turns, in comparison with the secondary coil 76 at the start of the measurement range 94. The core 98 from FIG. 6 can be used here and in all of the following figures again symmetrically with respect to the plane of symmetry 96. Owing to the secondary coil 76 with a lower turns number, the installation space requirement at the end of the measurement range 94 is reduced, while the reverse measure (point 2a) would result in an increased installation space requirement at the start. Since the reduction in the number of turns of the secondary coil 76 at the end results in an increase in accuracy and resolution in the region of particular interest at the start of the measurement range 94, the dimensions of the LIPS 48 can be reduced overall in order to reduce the values to the initial level. Therefore, a saving can be made on installation space at the start of the measurement range as well. The same should also apply to the figures discussed below.

Figure 7:
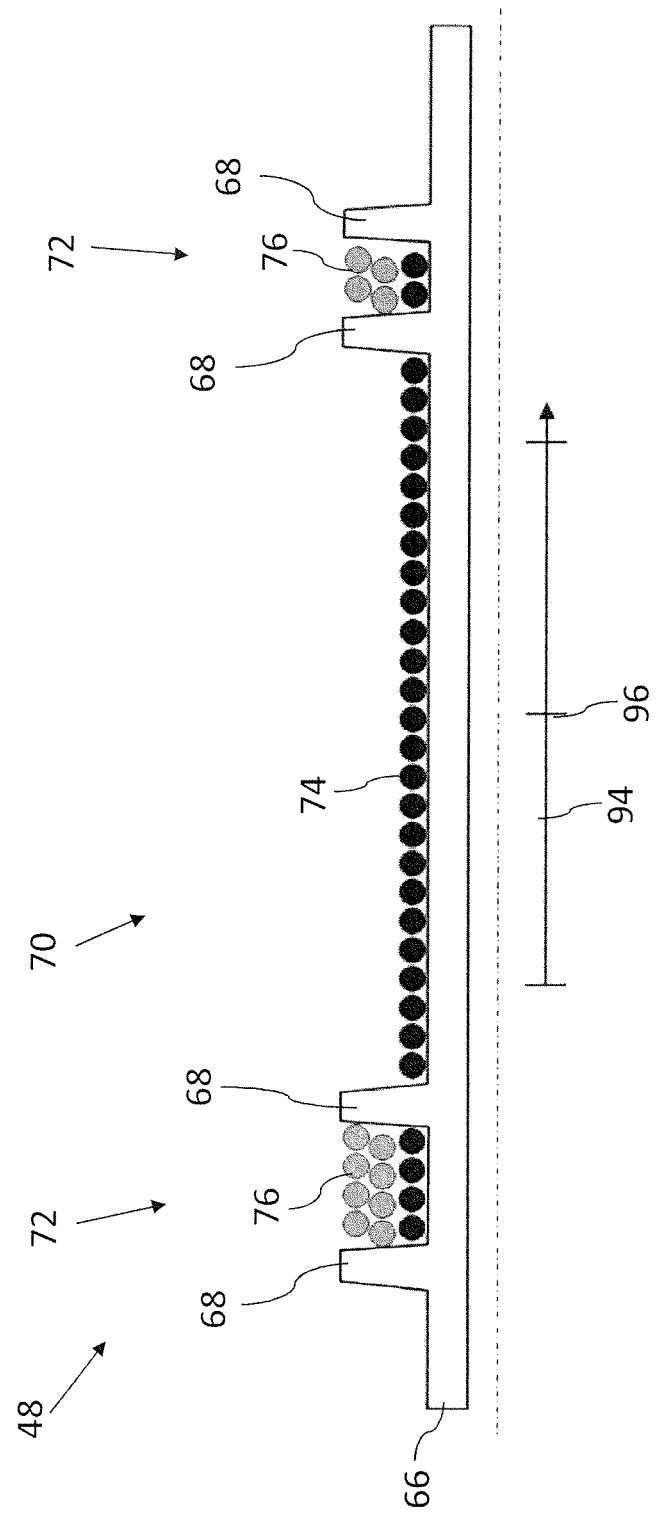
FIG. 7 shows a sectional illustration of another alternative linear position sensor.

FIG. 7 likewise represents a solution in accordance with the above point 2.b. The secondary coil 76 at the end of the measurement range 94 would in this case be reduced by half in terms of length. The technical effects of this measure are clearly similar to the technical effects of FIG. 6. An advantage over FIG. 6 consists in that either the total length of the LIPS 48 can now be shortened, or that the distance between the secondary coils 76 given the same outer dimensions can be increased, as a result of which a larger measurement range 94 is made possible.

Figure 8:
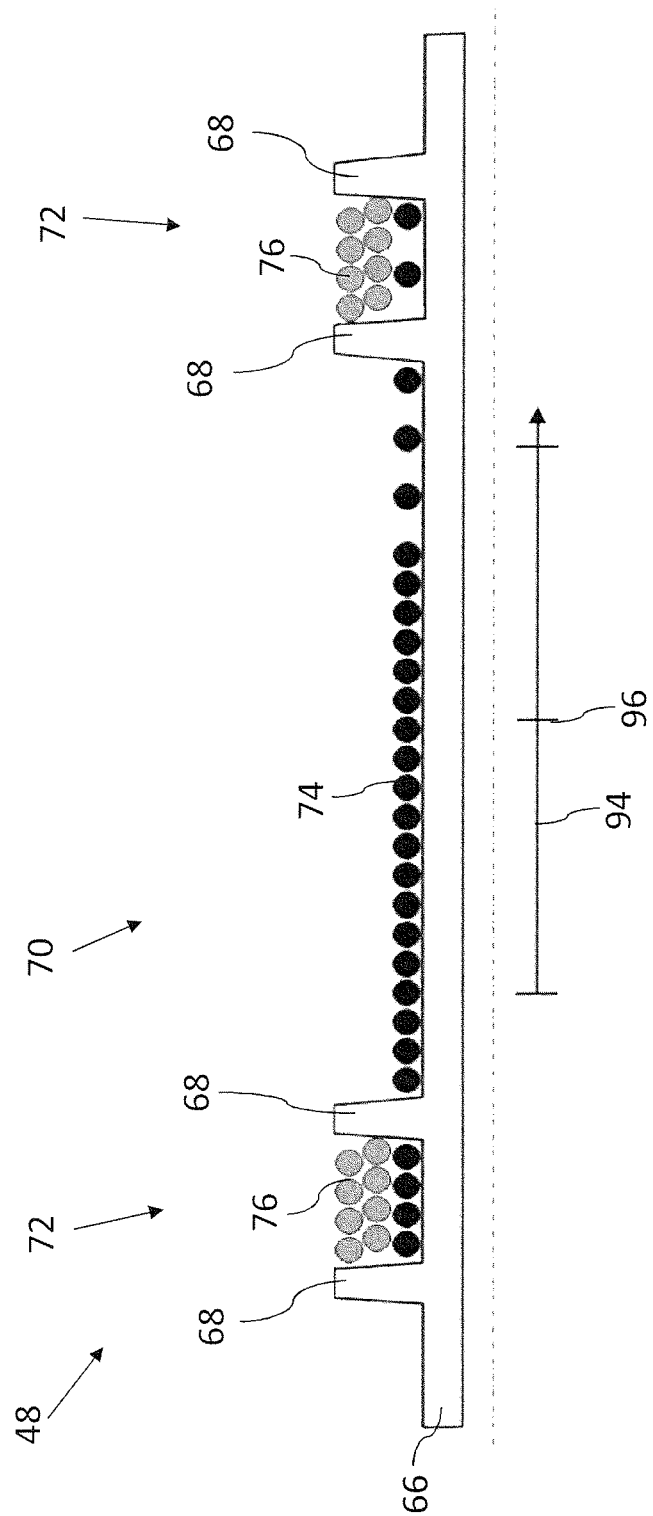
FIG. 8 shows a sectional illustration of a further alternative linear position sensor.

FIG. 8 illustrates a solution in accordance with the above point 3.b. The turns number per unit length of the primary coil 74 has been halved towards the end of the measurement range 94. It is preferred to change the turns number per unit length not suddenly but continuously along the measurement range 94 since the local resolution of the LIPS 48 can decrease to zero in the vicinity of a sudden change point.

Figure 9:
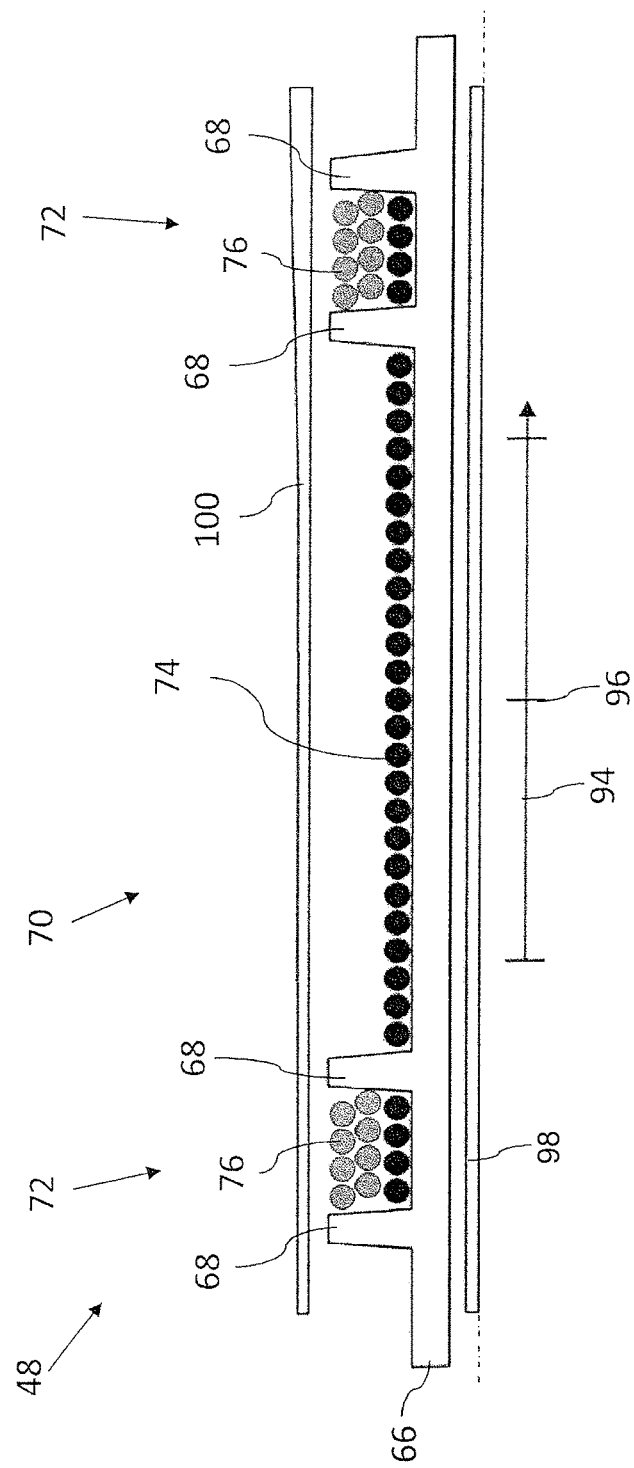
FIG. 9 shows a sectional illustration of yet a further alternative linear position sensor.

FIG. 9 shows a solution in accordance with the above point 4.b. The coils 74, 76 are in this case enclosed by a magnetic return path core 100, which can optionally also be provided in the other variants of the LIPS 48 in accordance with the previous figures. The particular feature of FIG. 8 consists in that this magnetic return path core 100 has a cross-sectional area which is dependent on the position within the measurement range 94 and increases in size towards the end of the measurement range 94. In this case, the embodiment of the LIPS 48 as shown in FIG. 8 is intended to be representative both of a variable cross section in the radial direction (as illustrated) and of a variable cross section perpendicular thereto, i.e. in the circumferential direction. Furthermore, the magnetic return path core 100 does not necessarily belong to the half-section illustration of the measuring transformer of the LIPS 48 since it is sufficient for operation if the magnetic return path core 100 is located on one side of the measuring transformer.

The invention claimed is:

1. A sensor for detecting a position of an encoder magnet in a movement direction, comprising:
   a first coil extending in the movement direction,
   a second and third coil oriented after the first coil, which second and third coils are arranged symmetrically with respect to one another in the movement direction, when considered in relation to a point of symmetry, and correspondingly form, with the first coil, a first and second transformer, whose transformation ratio is dependent on the position of the encoder magnet, and
   a magnetic asymmetry, which changes the transformation ratio of one of the transformers with respect to the other transformer,
   wherein the transformation ratio of the transformer, which is arranged at the front when viewed in the movement direction of the encoder magnet, is greater, by the magnetic asymmetry, than the transformation ratio of the transformer which is arranged at the rear, when viewed in the movement direction of the encoder magnet.

2. The sensor as claimed in claim 1, wherein the magnetic asymmetry comprises a geometric asymmetry.

3. The sensor as claimed in claim 1, wherein the asymmetry comprises an asymmetric geometry of the second coil with respect to the third coil.

4. The sensor as claimed in claim 3, wherein the asymmetric geometry of the second coil with respect to the third coil comprises an asymmetric turns number and/or turns number per unit length of the second coil with respect to the third coil.

5. The sensor as claimed in claim 1, wherein the asymmetry comprises a location-dependent change in the geometry of the first coil.

6. The sensor as claimed in claim 1, wherein the asymmetry comprises an element which changes a coupling between the first coil and the second coil of the first transformer with respect to a coupling between the first coil and the third coil of the second transformer.

7. The sensor as claimed in claim 6, wherein the element comprises a location-dependent cross-sectional geometry viewed in the movement direction.

8. The sensor as claimed in claim 6, wherein the element is arranged asymmetrically, when viewed from the point of symmetry.

9. An apparatus for actuating a braking system a vehicle, comprising:
- a brake pedal for setting a braking force by displacing the brake pedal in a movement direction and
- a sensor as claimed in claim 1 for detecting the position of the brake pedal in the movement direction and for outputting a signal indicating the braking force to be set depending on the detected position of the brake pedal.

10. The sensor as claimed in claim 7, wherein the element is arranged asymmetrically, when viewed from the point of symmetry.

* * * * *